United States Patent

[11] 3,633,406

| [72] | Inventor | Thomas F. Helms<br>New Fairfield, Conn. |
|---|---|---|
| [21] | Appl. No. | 48,043 |
| [22] | Filed | June 22, 1970 |
| [45] | Patented | Jan. 11, 1972 |
| [73] | Assignee | Idex Corporation<br>Danbury, Conn. |

[54] APPARATUS FOR TESTING ARTICLES
15 Claims, 4 Drawing Figs.

| [52] | U.S. Cl. | 73/45.5 |
|---|---|---|
| [51] | Int. Cl. | G01m 3/06 |
| [50] | Field of Search | 73/45.5, 46, 49.8, 40, 41.2, 41.3, 41.4, 45 |

[56] References Cited
UNITED STATES PATENTS

| 1,272,043 | 7/1918 | Hoff | 73/41.2 |
|---|---|---|---|
| 1,286,432 | 12/1918 | Singer | 73/45.5 |
| 1,589,825 | 6/1926 | Staebler | 73/46 |
| 2,660,053 | 11/1953 | Buehner | 73/40 |
| 3,131,638 | 5/1964 | Wilson et al. | 73/40 X |
| 3,323,351 | 6/1967 | Helms | 73/45.5 |

*Primary Examiner*—Louis R. Prince
*Assistant Examiner*—William A. Henry, II
*Attorney*—Bryan, Parmelee, Johnson & Bollinger ABSTRACT: An apparatus for testing articles such as can ends and the like is described. A lid for a can is placed to cover a pressurizable test chamber in a lower platen. An upper platen is brought down over the lid to firmly clamp the lid against the test chamber and submerge the platens below the surface of a body of liquid such as water. The upper platen is provided with a gas bubble capturing chamber to prevent gas bubbles trapped in and about the submerged structure from interfering with the observation of articles through ports in the upper platen. A transparent liquid damper is employed over the upper platen and is selectively spaced to be partially submerged in the liquid over the viewing ports for clear viewing of articles under test.

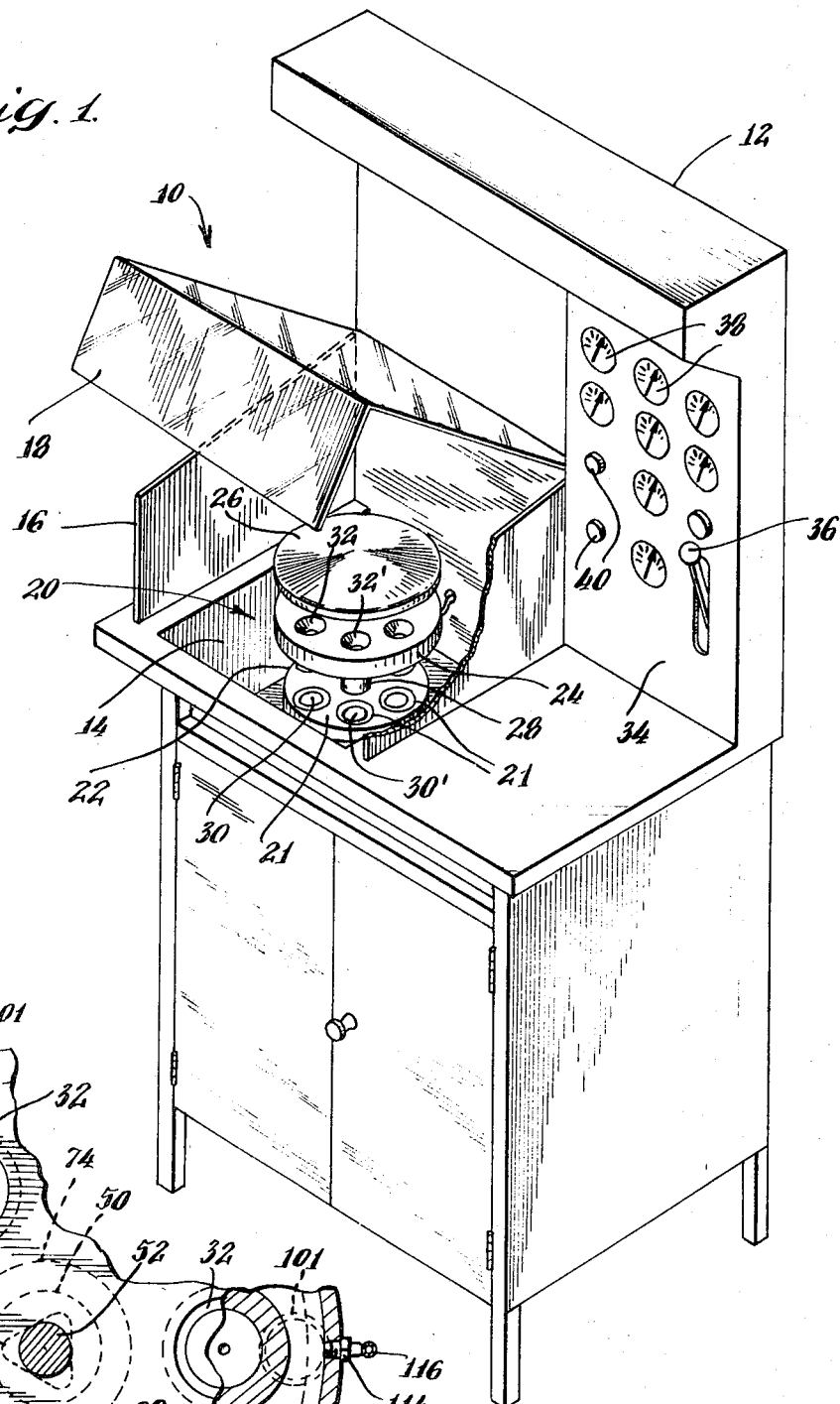

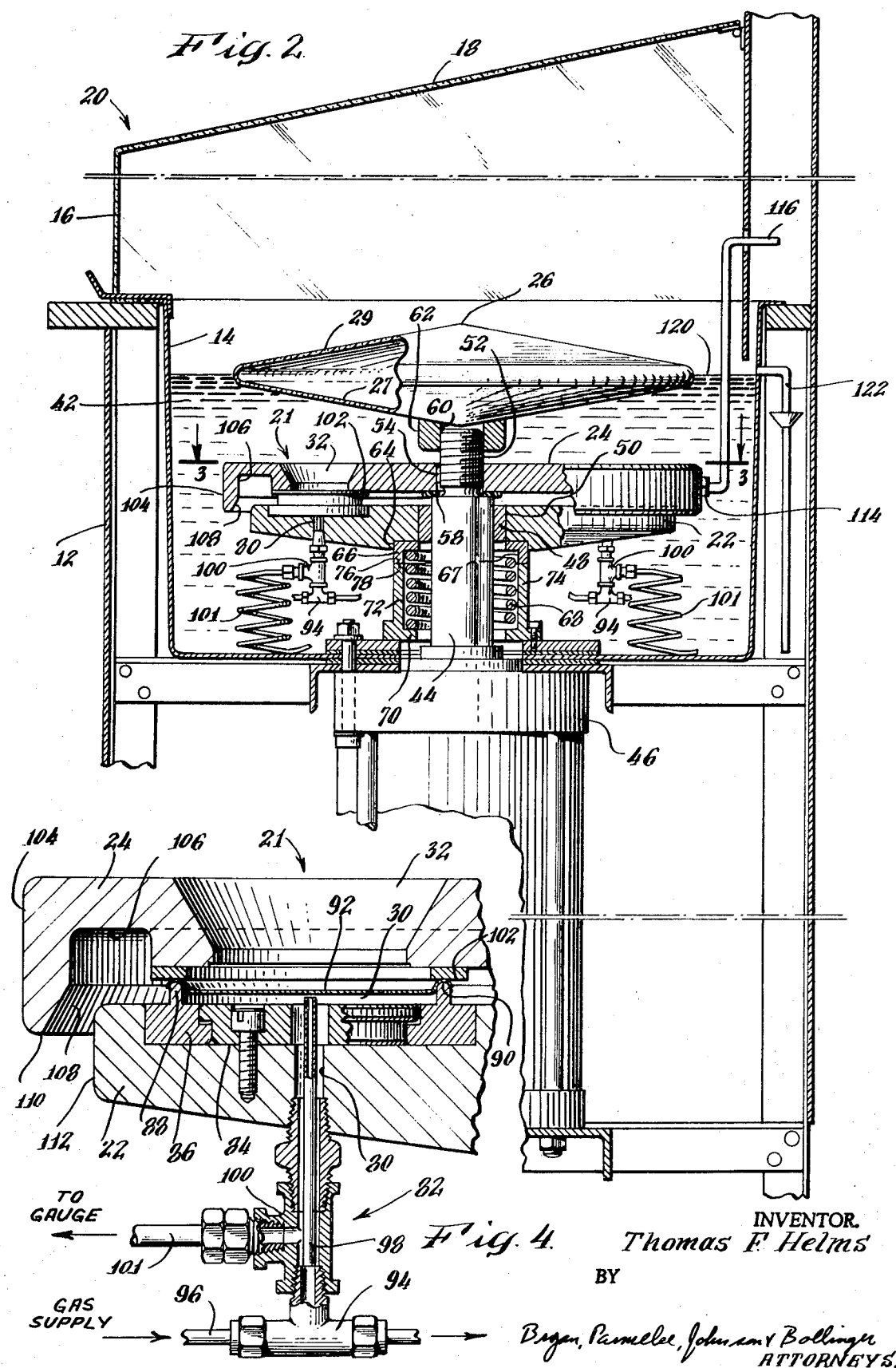

APPARATUS FOR TESTING ARTICLES

BACKGROUND OF THE INVENTION

This invention relates to an article tester. More specifically, this invention relates to a tester for detecting leaks in articles such as cans and components thereof in the form of lids, can bottoms and the like.

In my U.S. Pat. No. 3,323,351 I disclose an apparatus for testing the pressure tightness or leakproof quality of can ends. As described in this patent, it is desirable to test the integrity of can ends such as the prescored tear tab type to prevent using cans which are likely to burst or leak.

SUMMARY OF THE INVENTION

In an article tester in accordance with the invention an article such as a can end or the like is placed in a testing station which is submerged in a liquid-containing basin. The testing station includes a pair of vertically disposed platens. The lower platen is provided with an article test chamber having an upwardly open end. The open end is shaped and sized to be covered by an article and form a pressurizable test chamber for testing of the article. The upper platen is provided with a viewing port in alignment with the test chamber and an article-contacting edge to press the article to the lower platen. Upon gas pressurization of the test chamber, while the upper and lower platens are operatively engaged, gas bubbles indicative of article defects ascend from the viewing port in the liquid-containing tank and are observed for article leak detection.

An advantage of the article leak tester in accordance with the invention resides in that the article areas under test are clearly observable from above the liquid in the basin. In one embodiment incorporating the invention the upper platen is shaped and sized to capture gas bubbles which might be trapped among the structural components surrounding the article being tested. Such trapped air bubbles are channeled away from the view of the article area under test to provide a clear unobstructed view of the article through a port in the upper platen.

The leak holes in defective articles may be exceedingly small with leak hole detection depending upon the observance of tiny gas bubble streams. As described in an embodiment of an article leak tester in accordance with the invention a transparent liquid damper is positioned over the viewing port in contact with the liquid in the tank. The damper is selectively sized relative to the upper platen to provide a quiet surface area for observation of the viewing port in the upper platen. The transparent liquid damper advantageously enables one to observe articles being leak tested with little interference from a moving or vibrating liquid surface. The leak detection test may be reliably conducted in the presence of vibrations from heavy machinery and the like.

Selective shaping of the liquid damper produces an advantageous gas bubble shedding surface to maintain clear observation of articles under test. Such shaping of the transparent damper is preferably controlled to provide a convex-shaped transparent liquid damper. With the convex transparent liquid damper partially submerged in the liquid, gas bubbles from below are shunted to the side and liquid droplets on the upper surface are shed into the liquid to preserve a clear field of view. The convex transparent liquid damper may be hollow with its hollow filled with a liquid of suitable index of refraction to provide optical enlargement of the articles under test. The enlarged view of the articles advantageously enhances the detection of small leaks.

BRIEF DESCRIPTION OF DRAWINGS

These advantages and others may be further understood from the following description of an embodiment in conjunction with the drawings wherein:

FIG. 1 is a perspective view of an article leak testing apparatus in accordance with the invention with components in a position prior to commencing a leak test.

FIG. 2 is a vertical side section of the article leak testing apparatus of FIG. 1 showing the components in operative leak testing position;

FIG. 3 is a broken plan view of the upper and lower platen taken along the line 3—3 in FIG. 2.

FIG. 4 is an enlarged section view of an article test chamber and an article as it is leak tested in accordance with the invention.

DESCRIPTION OF EMBODIMENT

With reference to FIG. 1 an article leak-testing system 10 is shown formed of a housing 12 having a liquid basin 14 surrounded by a transparent protective cover 16 including a transparent lid 18. The protective cover 16 encloses a liquid submergible article leak tester 20 having a number of individual article-testing stations 21 uniformly distributed about a central axis.

The article leak tester 20 includes a lower platen 22, an upper platen 24 and a transparent liquid damper 26, all mounted on a coaxially located shaft 28 for vertical movement as will be described.

Lower platen 22 is provided with one or several article test chambers 30–30' which are axially aligned with viewing ports 32–32' in the upper platen 24. The article test chambers 30–30' are sized to be closed by a covering article such as the lid of a can or the like to form a gas pressurizable article testing chamber. Gas pressurization of the article test chambers is controlled from a console 34. Console 34 is provided with a control lever 36 to bring the platens into operative position with one another as well as pressure gauges such as 38 to monitor test chamber gas pressures and controls such as 40 for applying gas pressure to the several test chambers.

FIG. 1 shows the article leak tester 20 in a loading position. The protective guard lid 18 is raised to permit access to the clamping platens 22–24 which are shown extended above the level of the liquid in the basin 14 to provide dry access to the several article-testing stations 21.

With reference to FIG. 2 the article leak tester 20 is shown with the upper platen 24 and a lower platen 22 in clamped position while submerged below a liquid 42 retained by basin 14. Note the partial submergence of liquid damper 26 when platens 22–24 are clamped together. The liquid damper 26 has a convex downwardly shaped surface 27 and a convex upwardly shaped surface 29. Surface 29 is sufficiently sloped to aid the shedding of water droplets.

The lower and upper platens 22 and 24 are coaxially mounted to a vertically movable shaft 44. Shaft 44 sealing slides through a collar 46 affixed to housing 12 at the bottom of basin 14. A hydraulically actuated mechanism (not shown) controls the vertical movement of the shaft 44.

Shaft 44 is generally triangularly shaped (see FIG. 3) and passes through a correspondingly shaped slide bearing 48 mounted in a central bore 50 to lower platen 22. The upper end of shaft 44 is provided with a screw thread section 52. Threaded section 52 engages a similar thread in a bore 54 in upper platen 24 which is firmly clamped against an annular shoulder 58 on shaft 44.

The upper end of screw-threaded section 52 is firmly meshed with a similar thread in a bore 60 of a nut 62 coaxially located on the transparent liquid damper 26.

The lower platen 22 floats axially on rod 44 and is provided with a bottom located counterbore 64 to house an annular spring retainer 66. Retainer 66 has a counterbore 67 shaped to receive and retain a spring 68 to spring bias the lower platen 22 in an up position (see FIG. 1). The lower end of spring 68 is seated on an annular flange 70 located at the bottom of a coaxial bore 72 in an annular stop 74. Stop 74 and annular spring retainer 66 have axially opposing annular stop surfaces 76–78 shown adjacent one another to seat the lower platen 22 onto housing 12 and enable the upper platen 24 to develop full sealing pressure against the lower platen 22.

With reference to the enlarged section view of an article test station 21 in FIG. 4, lower platen 22 is shown provided with a gas supply passage 80 terminating at one bottom end of platen 22 in a gas fitting 82 and at an upper end in a counterbore 84. An annular chuck 86 is located in the counterbore 84 and provided with an annular lip 88 shaped and sized to form a peripheral seal 90 with an article to be tested such as can end 92. Gas fitting 82 includes a T-shaped gas fitting 94 connected in parallel with a gas supply line 96 to supply gas to test chamber 30 through a tube 98 located in passage 80. Test pressure in chamber 30 is measured by monitoring the gas pressure in passage 80 through T-shaped fitting 100. Coiled-shaped gaslines such as 101 connect the gauges 38 to the pressure monitoring passages and accommodate vertical movements of lower platen 22. The gas supply line 96 connects the several test stations in parallel with a coiled gas supply line section (not shown) provided in a similar manner as coiled sections 101 for connection to a gas pressure source (not shown).

As shown in FIG. 4 the upper platen 24 has a viewing port 32 formed of an annular surface which is flared as indicated to provide adequate viewing area from above the liquid 42. The upper platen is provided with an article-contacting edge 102 sized and shaped to form a peripheral seal with the can lid 92. In the specific embodiment illustrated in FIG. 4 the article-contacting edge is formed of an annular resilient sealing rim sized to contact the lid 92 directly axially opposite the annular lip 88 of chuck 86. The article-contacting edge 102 effectively prevents gas bubbles trapped by adjacent surfaces from passing into the field of view below port 32.

Upper platen 24 is further shaped so that its outer peripheral surface 104 extends radially beyond most of the components of the apparatus located within basin 14. Upper plate 24 is provided with an annular slot 106 surrounding ports such as 32 and facing downwardly to capture air bubbles trapped below upper platen 24. Slot 106 terminates in a downwardly radially expanding chamfered surface 108 to increase the gas bubble capturing range of the slot 106. Note that the bottom edge 110 of chamfered surface 108 protrudes radially beyond the peripheral edge 112 of lower platen 22. As shown in FIG. 2, a vent 114, in communication with slot 106, allows trapped gas to escape through tube 116 away from the viewing path to ambient. The remainder of the bottom surface of upper platen 24 is substantially flat.

In the operation of the article leak tester 10, the rod 44 is initially actuated to rise upwardly, thus positioning the upper platen 24 and the liquid damper 26 above the surface of the liquid in the basin 14. The rise of rod 44 enables the spring 68 to axially move the lower platen up with the rod 44 until spring 68 attains its normal length. Spring 68 and the liquid level in basin 14 are preferably selected so that the spring 68 may lift the lower platen's upper surface out of the liquid for dry access to the test chambers 30. Preferably the spring 68 is sufficiently long to place the open end of test chambers above a liquid over flow level 120 determined by the axial location of a liquid overflow drain 122. At this time the relative positions of the platens 22-24 and liquid damper 26 are shown in FIG. 1.

Articles such as can ends 92 are then placed over the test chambers 30. The can ends may be of the prescored-type utilizing tear tabs or strips and the like which may be pulled free to create pouring openings. The tightness of the prescored areas or their sealing pressure strength may be examined with the apparatus of this invention.

The liquid in the basin may be water. The rod 44 is actuated downwardly to clamp the upper platen 24 against the lower platen 22 before the latter is submerged in the water. Chucks 86 may be flexibly mounted to the lower platen 22 so that minor variations in the can ends 92 or in the parallelism between the platens 22-24 can be accommodated. The triangular shape of rod 44 assures in maintaining the platens 22-24 in angular alignment with each other.

As rod 44 is moved down, the upper platen's article-contacting edge 102 is seated against the lid 92 and causes a firm watertight seal of test chamber 30 before the lower plate 22 is submerged. When the lower platen is fully submerged and retainer 66 has bottomed out against the annular stop surface 78 full clamping pressure is developed. This clamping pressure is sufficient to form a practically gastight test chamber 30.

The advantage of the gas bubble capturing slot 106 may be fully appreciated in light of the gastightness of test chamber 30. The full gas test pressure may be developed in chamber 30 even though some gas leakage occurs. The leaking gas is prevented from passing into the viewing ports 32 because of the peripheral article seals between edge 102 and lid 92. Escaping and rising gas is trapped by the annular slot 106 and vented to ambient by tube 116.

The axial position of the liquid damper 26 when lower platen 22 has bottomed out is selected so that the damper 26 is but partially submerged. Preferably, the axial position of liquid damper 26 is selected to place the liquid surface 120 generally at the joint of surfaces 27–29. This axial position of surface level 120 assures sufficient quiet surface area for viewing of the ports 32 in the upper platen 24.

After the lower platen 22 has bottomed out and full clamping pressure is developed by rod 44 testing of articles can begin. Gas is supplied through a flexible coil line such as 101 to pressurize the test chambers. Gauges 38 as well as the viewing ports 32 are then observed for leaks in the submerged can ends.

Gas is supplied from a pressurized source (not shown) at a pressure selected to reveal leaks in an article by the ascent of bubbles from the viewing ports 32. The bubbles may be clearly viewed through the transparent damper. As the bubbles ascend and reach the underside 27 of damper 26 they are shed to the side to leave an unobstructed view.

As may be appreciated from the view in FIG. 1 a number of articles may be tested simultaneously with the viewing ports 32 each of which provides leak detection capability of respective individual articles.

The convex-shaped liquid surface damper 26 is formed of plastic materials in the form of a hollow plastic lens. The hollow of the lens may be filled with a liquid of suitable refractive index, for example mineral oil, to obtain a considerable magnification of the can ends 92 being tested.

The actuation of rod 44 includes the development of a substantial sealing clamping pressure between the platens 22-24. Hydraulically actuated devices are conveniently employed to develop the clamping pressure. Suitable conventional hydraulic controls and valving are located in the housing but not specifically illustrated.

Having thus described an apparatus for leak testing or pressure strength testing of articles variations of the several elements may be employed. For instance, circular ends for cans have been specifically described though other article shapes may be accommodated.

I claim:

1. An apparatus for testing articles such as can ends and the like for leaks comprising
    a housing, said housing being provided with a liquid-retaining basin,
    a lower platen mounted for submergence in the liquid in the basin, said lower platen being provided with a test chamber having an upwardly facing open end shaped to be covered by an article placed thereover to form a pressurizable test chamber,
    an upper platen mounted over the lower platen and provided with a viewing port in visual alignment with the test chamber to observe an article being pressure tested,
    means for clamping the upper platen to the lower platen to pressure seal the article against the submerged lower platen, and
    a transparent liquid surface damper positioned over the upper and lower platens in optical alignment with the viewing port, said damper being partially submergible in the liquid to provide a clear unobstructed view of the viewing port substantially free from liquid surface movements.

2. The apparatus for testing articles such as can ends and the like for leaks as claimed in claim 1 wherein said upper platen is further provided with a downwardly facing gas bubble capturing chamber sized and shaped to capture gas bubbles trapped by the platens and the clamping means and vent means for discharging gas captured by the chamber.

3. The apparatus for testing articles such as can ends and the like for leaks as claimed in claim 2 wherein said upper platen is shaped to provide a peripheral edge which overlaps the lower platen and the clamping means with said chamber peripherally located in said upper platen to effectively capture gas bubbles escaping upwardly in the liquid around the lower platen and clamping means.

4. The apparatus for testing articles such as can ends and the like for leaks as claimed in claim 1 wherein said liquid damper is provided with a downwardly convex transparent surface shaped to shed gas bubbles arising from the viewing port to maintain a clear unobstructed view of the article being tested.

5. The apparatus for testing articles such as can ends and the like for leaks as claimed in claim 4 wherein said transparent liquid damper is further provided with an upwardly convex transparent surface shaped to shed liquid droplets into the liquid-containing basin.

6. The apparatus for testing articles such as can ends and the like for leaks as claimed in claim 1 wherein said clamping means further includes a shaft extending upwardly from the bottom of the basin, said lower platen being movable along said shaft, said shaft being affixed to the upper platen and said transparent liquid damper, said shaft further being vertically movable and sized to raise the upper platen and transparent liquid damper above the surface of the liquid and to lower the upper platen for clamping against the lower platen, and means for moving said lower platen above the surface of the liquid to provide dry access to the test chamber for article loading and removal.

7. The apparatus for testing articles such as can ends and the like for leaks as claimed in claim 6 wherein said upper and lower platen are annular and coaxially mounted on the shaft, with said upper platen radially extending beyond the lower platen and provided with a downwardly facing annular gas bubble capturing slot peripherally surrounding the lower platen and means for discharging gas bubbles captured by the slot away from the viewing path to the port.

8. The apparatus for testing articles such as can ends and the like for leaks as claimed in claim 7 wherein said lower platen moving means further includes a coiled spring coaxially located with the shaft and sized to urge the lower platen above the liquid surface upon the raising of the shaft and stop means disposed between the bottom of the basin and the lower platen to seat the lower platen upon the submergence thereof by the lowering of the shaft and enable the development of full clamping pressure between the upper and lower platens.

9. The apparatus for testing articles such as can ends and the like for leaks as claimed in claim 8 wherein said lower platen is provided with a plurality of test chambers distributed about the shaft and with said upper platen provided with corresponding ports aligned with the test chambers and with said annular gas bubble capturing slot surrounding said test chambers and ports to preserve a clear unobstructed view of articles being tested.

10. An article leak tester comprising a liquid-retaining basin, a lower platen provided with an article test chamber having an upwardly open end, the open end of the test chamber being shaped and sized for sealing thereof by one side of an article to be tested and placed over the open end, said lower platen being disposed for submergence in the liquid in the basin, an upper platen having a viewing port therein, said upper platen viewing port being aligned with the test chamber in the lower platen and having an article-contacting edge to form a seal around the article's other side opposite to said one article side, said viewing port exposing said article other side for inspection, said upper platen being disposed for submergence in the liquid in the basin and movably mounted relative to the lower platen for insertion and removal of articles over the test chamber and seating the article-contacting edge against an article disposed over the test chamber, said upper platen being provided with a gas bubble capturing chamber effectively surrounding the test chamber to prevent gas bubbles trapped by the liquid submergence of the platens from disturbing the view of the article other side through the liquid and viewing port, a vent coupled to the gas capturing chamber and disposed to discharge gas therefrom away from the viewing path, and means for pressurizing the test chamber with a gas at a pressure selected to reveal leaks by causing bubbles to rise from the article's other side through the viewing port whereby article leaks may be quickly and accurately detected.

11. The article leak tester as claimed in claim 10 and further including a transparent liquid damper positioned over the viewing port and partially submerged within the liquid in the basin, said damper dampening liquid surface motions for enhanced inspection of submerged articles.

12. The article leak tester as claimed in claim 11 wherein the transparent damper is a transparent lens selected to enlarge the view of the article's other side.

13. The article leak tester as claimed in claim 12 wherein said transparent damper is hollow and shaped in the form of a lens with the hollow filled with a liquid of a different index of refraction from the liquid in the basin to enlarge the view of the article's other side as seen through the viewing port.

14. The article leak tester as claimed in claim 10 wherein the lower platen is mounted to the basin for movement above and below the surface of the liquid.

15. The article leak tester as claimed in claim 10 wherein said upper platen extends beyond the peripheral edge of the lower platen to capture gas bubbles arising from around the lower platen and channel these gas bubbles to the gas bubble capturing chamber in the upper platen.

* * * * *